March 21, 1961 J. PAUL 2,975,553
APPARATUS FOR CULTURE OF BIOLOGICAL CELLS AND TISSUES
Filed Aug. 25, 1958 7 Sheets-Sheet 1

----- NORMAL CIRCUIT.
—·— CIRCUIT WHEN SOLENOID
IS OPERATING.

JOHN PAUL - INVENTOR

Attorneys for Applicant

March 21, 1961    J. PAUL    2,975,553
APPARATUS FOR CULTURE OF BIOLOGICAL CELLS AND TISSUES
Filed Aug. 25, 1958    7 Sheets-Sheet 3

JOHN PAUL - INVENTOR

Attorneys for Applicant

March 21, 1961 J. PAUL 2,975,553
APPARATUS FOR CULTURE OF BIOLOGICAL CELLS AND TISSUES
Filed Aug. 25, 1958 7 Sheets-Sheet 4

JOHN PAUL - INVENTOR
Attorneys for Applicant

March 21, 1961 J. PAUL 2,975,553
APPARATUS FOR CULTURE OF BIOLOGICAL CELLS AND TISSUES
Filed Aug. 25, 1958 7 Sheets-Sheet 5

JOHN PAUL - INVENTOR

Attorneys for Applicant 2,975,553
Patented Mar. 21, 1961

2,975,553
APPARATUS FOR CULTURE OF BIOLOGICAL CELLS AND TISSUES

John Paul, Glasgow, Scotland, assignor to National Research Development Corporation, London, England, a corporation of Great Britain Filed Aug. 25, 1958, Ser. No. 756,836

Claims priority, application Great Britain Aug. 23, 1957

13 Claims. (Cl. 47—1)

This invention relates to apparatus for culture of biological cells and tissues.

The primary object of the present invention is to provide for continuous automatic culture of biological cells and tissues.

A further object is to maintain cells and tissues being cultured in the apparatus in a steady state of metabolism.

Apparatus according to the invention consists of a circuit (hereinafter referred to as the "first circuit") including a reservoir for liquid medium for cells or tissues to be cultured, a circuit (hereinafter referred to as the "second circuit") connected to the first circuit and including a growth vessel in which cells or tissues are maintained in suspension, and means including a pump influenced by timing mechanism for removing batches of suspension from the vessel at predetermined intervals and for replacing automatically with fresh medium from the reservoir suspension removed from the vessel in such wise that the concentration of cells or tissue in the vessel remains substantially constant.

Apparatus according to the invention is illustrated in the accompanying drawings in which:

Fig. 8 is a flow sheet of the electrical circuits of the culture controlling means illustrated in Fig. 7.

Figure 1:
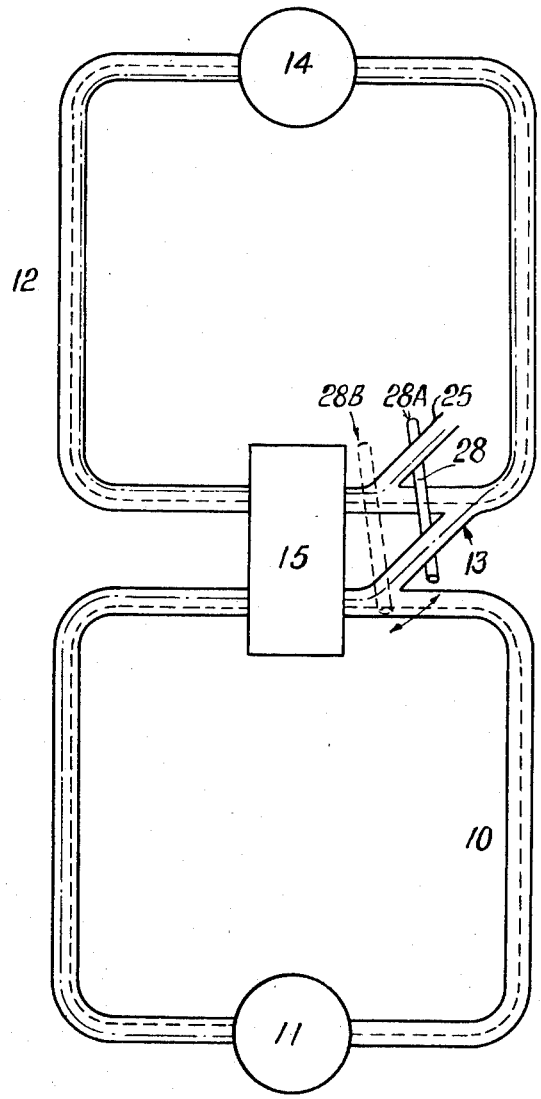
Fig. 1 is a schematic view of the circuits for culture of cells or tissue.

Referring to the drawings in which some of the parts, being well known, are illustrated diagrammatically, 10 denotes a first circuit including a reservoir 11 for liquid medium for cells or tissues to be cultured. 12 denotes a second circuit connected by a branch 13 to the first circuit 10 and including a growth vessel, denoted generally by 14, in which cells or tissues are maintained in suspension. 15 denotes a peristaltic pump common to both circuits 10, 12 and operable by an electric motor 15A to effect circulation of the medium in the two circuits. A torque converter 15D is incorporated in the drive from the motor 15A to the pump 15. The branch 13 is downstream of the pump 15. The vessel 14 is located in a tank 14A containing water maintained at a temperature of approximately 38° C. by a thermostatically-controlled heating unit 14B.

Figure 3:
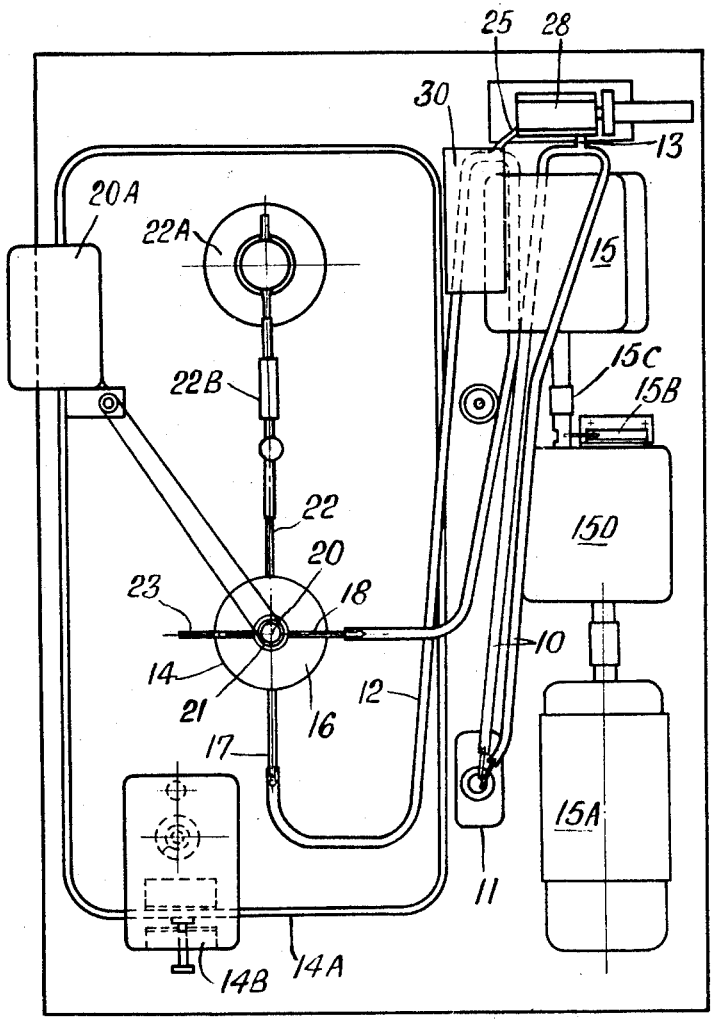
Fig. 3 is a plan view on the line 3—3 of Fig. 2.
Figure 5:
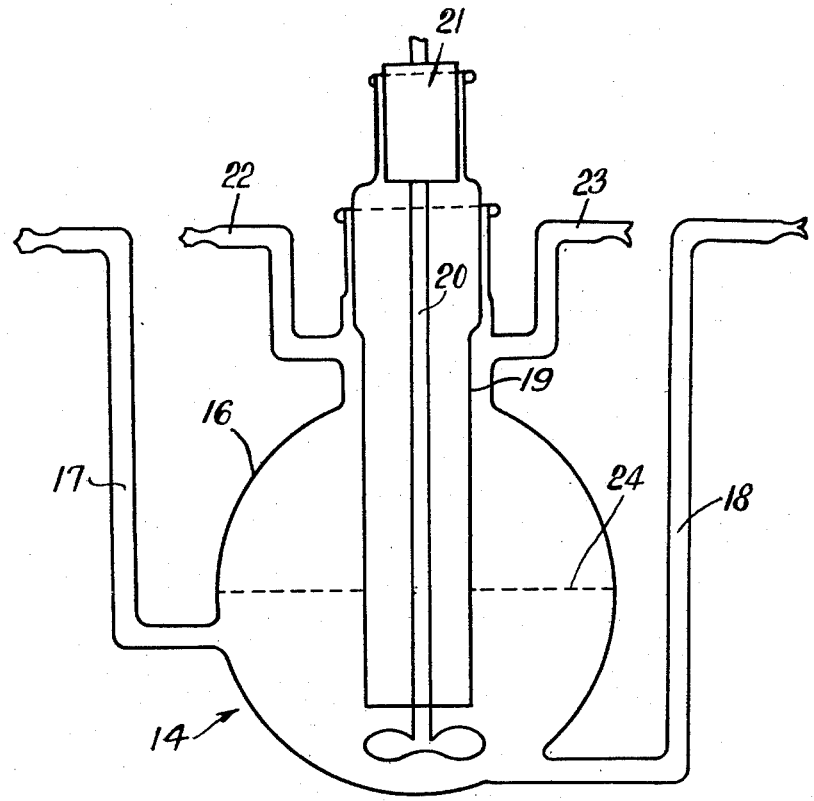
Fig. 5 is an elevation of a growth vessel in the apparatus.
Figure 6:
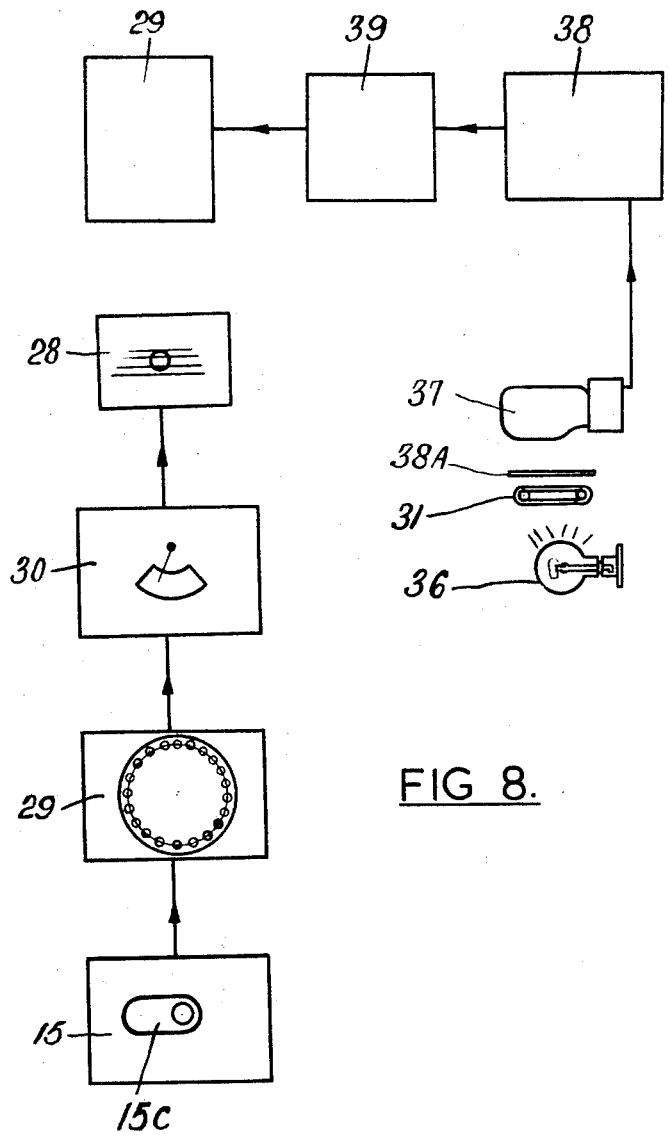
Fig. 6 is a flow sheet of part of the electrical circuits of the apparatus.

Referring to Figs. 3 and 5, 16 denotes a flask constituting the growth vessel 14 and formed near the bottom with an inlet branch 17 for admission of medium to the flask 16 and with an outlet branch 18 for extraction of medium from the flask 16. 19 denotes a sleeve mounted in a stopper in the neck of the flask 16 and depending into the interior of the flask. 20 denotes a stirrer operatively connected to a motor 20A, depending from a gland 21 in the upper end portion of the sleeve 19 and rotatable within the sleeve 19 to maintain cells or tissues in suspension in the medium.

The numeral 22 denotes a branch near the top of the flask 16 for admission to the flask of gas containing, for example, five percentum of carbon dioxide. The mixture of gas and carbon dioxide from, for example, a cylinder (not illustrated) flows through a flask 22A containing water and to the flask 16 by way of a duct 22B containing filters. 23 denotes a branch near the top of the flask 16 for exhaust from the flask of the gas mixture. Admission to the flask of a gas mixture is known practice and provides inter alia for the formation in the medium of a buffer system to regulate the pH of the medium.

The parts of the flask are preferably of glass or other rigid material.

Approximately 0.1 to 0.2 percentum of agar or other material for increasing the viscosity of the medium is desirably mixed with the medium to prevent coating of the parts of the apparatus with cells or tissues and to maintain the cells or tissues in suspension in the medium.

It is important that the lower end portion of the sleeve 19 should be below the surface 24 of the medium in the flask to prevent wave formation and vibration at the surface of the medium on rotation of the stirrer 20.

Figure 2:
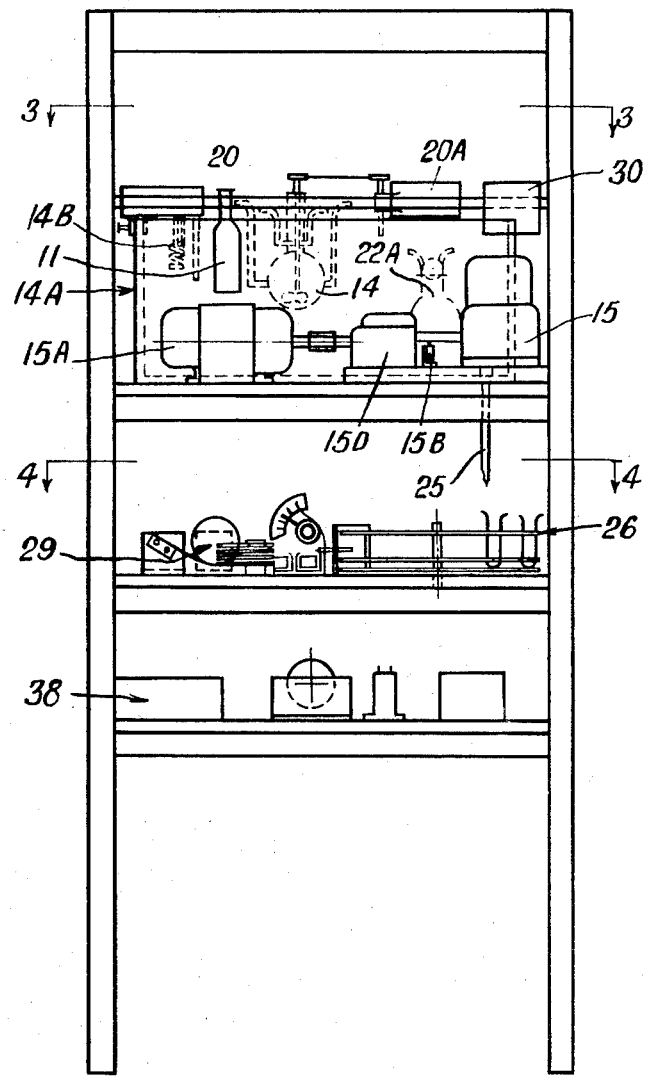
Fig. 2 is a front elevation of the apparatus.
Figure 4:
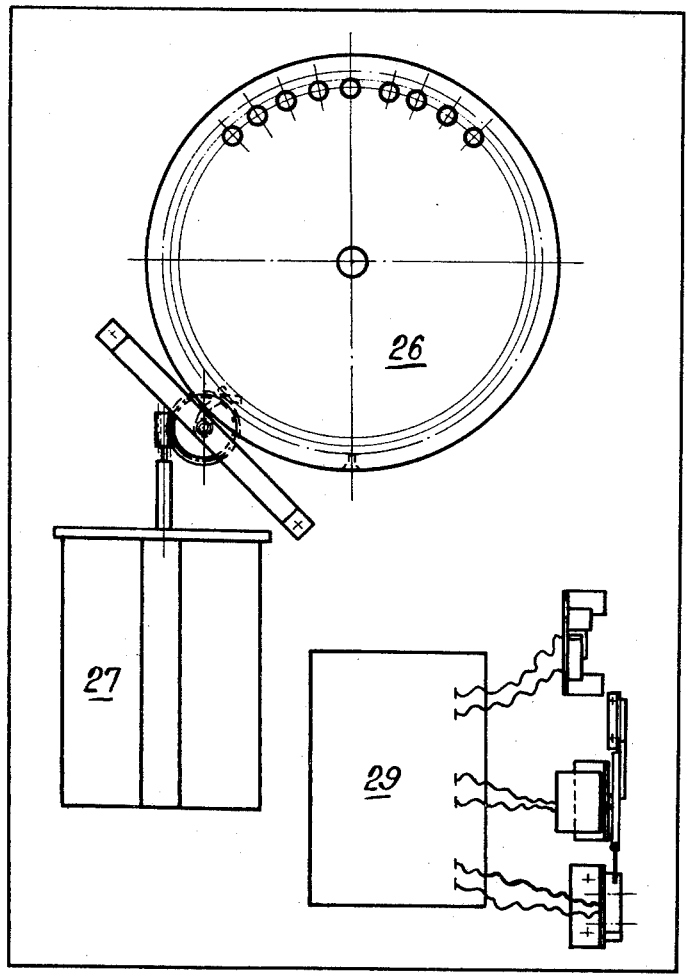
Fig. 4 is a plan view on the line 4—4 of Fig. 2.

Referring again to all the figures, the second circuit 12 is provided with a branch 25 leading to a receiver 26 (Figs. 2 and 4) for cultured cells or tissue. The receiver 26 consists of a fraction collector adapted to be turned about a vertical axis on operation of a motor 27.

A solenoid-operated tap 28 (Figs. 1 to 3 and 6) serving as a shunt is in electrical circuit with timing mechanism denoted generally by 29 and is operable, at predetermined intervals of time, to shunt the flow of suspension from the second circuit 12 to the receiver 26 and the flow of fresh medium from the first circuit 10 to the second circuit 12.

Uniselector relay means 30 is provided in the circuit from the tap 28 to the mechanism 29 to sustain the tap 28 in the position partially closing the circuits 10, 12 until after reception of a predetermined number of impulses from a switch 15B operated by a cam 15C associated with the drive from the motor 15A to the pump 15 when the relay means 30 is reset automatically until a fresh impulse from the mechanism 29 causes the relay means 30 to operate.

Figure 7:
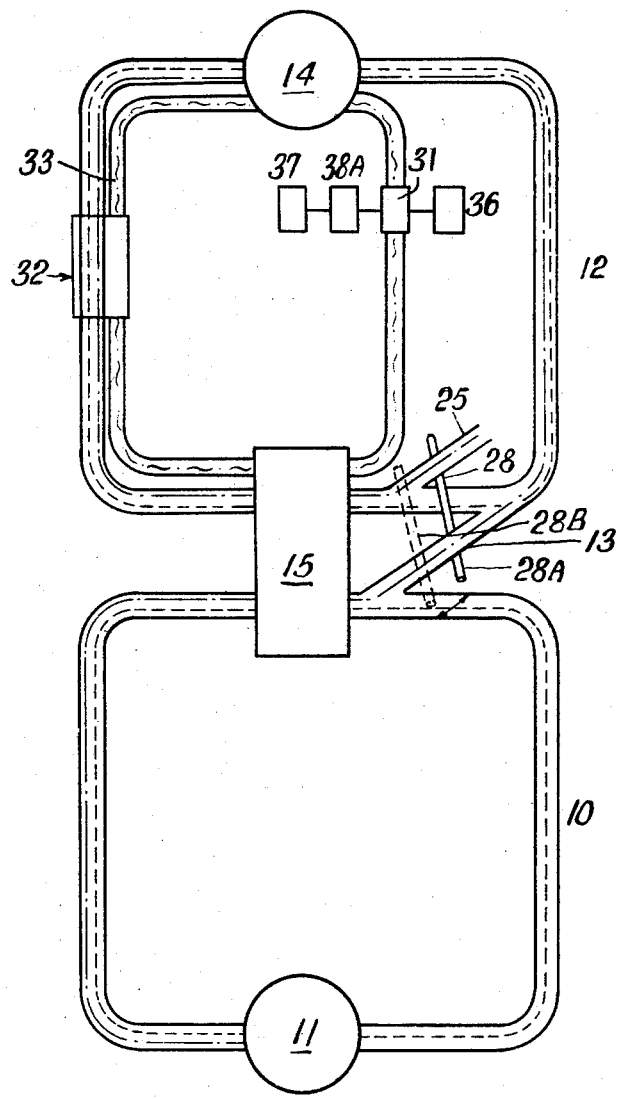
Fig. 7 is a schematic view of means for controlling the flow of culture through the circuits illustrated in Fig. 1.

The tap 28 consists of a spring-loaded bar (partially illustrated in Figs. 1 and 7) which, in one position, 28A, presses against and closes the branches 13, 25 from the two circuits 10, 12 to permit circulation of the medium, as indicated by chain lines in Figs. 1 and 7, only through the respective circuits and, on actuation, moves to another position, 28B, in which it releases the branches 13, 25 and presses against and partially closes the two circuits 10, 12 to permit the flow of medium in the direction indicated by chain-dotted lines in Fig. 1.

While, in the apparatus as hereinbefore described, the rate of removal of suspension from the growth vessel 14 and the rate of replacement of the medium in the vessel 14 is controlled by impulses from the mechanism 29 adjusted arbitraarily to correspond to the rate of growth of the cells or tissue, it is desirable for many purposes that the rate of removal and replacement of cells or tissue should be related more directly to the rate of growth of the cells or tissue in the vessel 14.

It is possible to achieve this relation by checking, as hereinafter described, the pH of the medium.

I provide a closed circuit for the flow of a salt solution containing phenol red, and including a glass cell 31, a dialysis vessel 32 and the peristaltic pump 15. The dialysis vessel 32 is interposed between the pump 15 and the growth vessel 14 downstream of the growth vessel 14 a duct 33 from which passes through the interior of the vessel 32. The part of the duct 33 within the dialysis vessel 32 is of the nature of a semi-permeable membrane. The medium in the duct 33 is in equilibrium with the salt solution in the dialysis vessel 32 the colour of the phenol red in the solution varying with the concentration of acid in the medium.

The glass cell 31 is interposed between a source of light 36 and a photo-electric cell 37. A light filter 38A contrived to permit the passage of light of only 530 to 580 m$\mu$. is interposed between the photo-electric cell 37 and the glass cell 31. The output from the photo-electric cell 37 varies with variations in the colour of the phenol red and thus the pH of the medium. The electric current produced by the photo-electric cell 37 is amplified and is fed to the grid of a thyratron valve circuit 38 so adjusted as to permit the passage for an electric current at the desired pH of the medium, say, a pH of below 7.2 to 7.4. When the thyratron valve circuit 38 operates, the circuit 38 closes a relay 39 which is normally in series with the circuit of the mechanism 29 which is actuated to transmit an impulse to and to operate the solenoid-operated tap 28. Impulses to operate the tap 28 are transmitted by the mechanism 29 to the tap 28 after periods of time of say, 7.5 minutes. An accurate control of the culture is effected as the addition of fresh medium to the first circuit 10 tends to make the medium in the growth vessel 14 more alkaline.

In a modification (not illustrated), I control the addition of medium to and the removal of suspension from the first circuit 10 by observation of the concentration of cells in the medium at any particular time.

I intercalate a glass cell in the second circuit 12 between the reaction vessel 14 and the pump 15 and downstream of said vessel 14. The glass cell is interposed between a source of light and a photo-electric cell, a neutral filter being interposed in turn between the glass cell and the photo-electric cell to provide a turbidimetric reading which is proportional to the concentration of cells in the medium flowing through the glass cell.

The photo-electric cell controls operation of the thyratron valve circuit 38 which is so adjusted as to operate at a preselected concentration of cells in the glass cell and to close the relay 39 which is normally in series with the circuit of the mechanism 29. The solenoid-operated tap 28 is actuated in the manner as hereinbefore described.

What is claimed is:

1. Apparatus for the culture of biological cells and tissues comprising means defining a first closed circuit including a reservoir for liquid culture medium, means defining a second closed circuit including a growth vessel for the formation of a suspension of the cells or tissues in the liquid culture medium, means for circulating the culture medium and the suspension in their respective circuits, and means for withdrawing batches of the suspension from the second closed circuit and simultaneously replacing each batch with culture medium from the first closed circuit, at predetermined intervals adapted to maintain the concentration of cells or tissues in the growth vessel substantially constant.

2. Apparatus according to claim 1 wherein said withdrawing and replacing means includes duct means connecting the first and second closed circuits.

3. Apparatus according to claim 2 wherein said withdrawing and replacing means further comprises duct means for withdrawing the batches of suspension from the second closed circuit, and valve means associated with said first-named and said second-named duct means.

4. Apparatus according to claim 3 wherein said valve means comprises shunt means for limiting flow in the first and second closed circuits while simultaneously opening the first-named and second-named duct means.

5. Apparatus according to claim 4 wherein said shunt means is operatively disposed to open said first-named and second-named duct means while constricting flow in said first and second closed circuits downstream of the circulating means intermediate respectively, in the case of the first closed circuit, the point at which the first-named duct means communicates therewith and the reservoir, and in the case of the second closed circuit, the circulating means and the point at which the second-named duct means communicates therewith.

6. Apparatus according to claim 4 wherein said withdrawing and replacing means further comprises means for actuating said shunt means at predetermined intervals adapted to maintain the concentration of cells or tissues in the growth vessel substantially constant.

7. Apparatus according to claim 6 wherein said actuating means includes a timing mechanism associated with said circulating means.

8. Apparatus according to claim 7 wherein said timing mechanism is in an electrical circuit with said shunt means.

9. Apparatus according to claim 8 wherein said circulating means is a pump and said actuating means further comprises uniselector relay means in the electrical circuit with the timing mechanism and said shunt means and operative to actuate the shunt means at a predetermined number of cycles of the pump.

10. Apparatus according to claim 9 wherein said shunt means is a solenoid operated tap.

11. Apparatus according to claim 9 further comprising means defining a third closed circuit communicating with the growth vessel and the pump and carrying a solution containing a pH indicator, a dialysis vessel in the third closed circuit intermediate the growth vessel and the pump downstream of the growth vessel, and photoelectric means associated with the third closed circuit intermediate the pump and the growth vessel downstream of the pump and for activating said relay means in response to a predetermined pH indication in the third closed circuit.

12. Apparatus according to claim 1 further comprising means for maintaining the cells or tissues in suspension in the growth vessel.

13. Apparatus according to claim 1 wherein said withdrawing and replacing means includes a receiver for cultured cells or tissues.

References Cited in the file of this patent

UNITED STATES PATENTS

| | | |
|---|---|---|
| 1,874,667 | Wada | Aug. 30, 1932 |
| 2,658,310 | Cook | Nov. 10, 1953 |

OTHER REFERENCES

Publication: Burlew, "Algal Culture," published 1953 by Carnegie Institution of Washington, D.C., as their Publication 600. Page 114 is relied on.